Jan. 14, 1930. R. H. PARKER Re. 17,562

FRUIT OR PRESERVE JAR

Original Filed March 27, 1926

Raymond H. Parker,
Inventor,
Delos G. Haynes
Attorney

Reissued Jan. 14, 1930 Re. 17,562

UNITED STATES PATENT OFFICE

RAYMOND H. PARKER, OF SOUTH WEYMOUTH, MASSACHUSETTS, ASSIGNOR, BY MESNE ASSIGNMENTS, TO OWENS-ILLINOIS GLASS COMPANY, OF TOLEDO, OHIO, A CORPORATION OF OHIO

FRUIT OR PRESERVE JAR

Original No. 1,703,795, dated February 19, 1929, Serial No. 98,002, filed March 27, 1926. Application for reissue filed September 26, 1929. Serial No. 395,410.

The invention is applicable in connection with so-called fruit or preserve jars.

The invention has for its general object to provide for facilitating the opening of a filled fruit or preserve jar, to give access to its contents, through removal of the cap or closure of the jar from its seat around the mouth of the jar.

As is well-known, a cap or closure often is held so firmly to its seat by external atmospheric pressure, in consequence of the existence of a more or less complete vacuum inside the jar, that great difficulty is experienced in effecting removal. This difficulty is more troublesome when the nature of the contents of the jar is such as to cement or stick the cap or closure to its seat. The usual recourse, in practice, is to insert a knife-blade, or other implement between the rim of the cap or closure and the seat therefor, and then pry the rim apart from the seat so as either to overcome the sticking and the atmospheric pressure wholly through the application of force, or, through admitting air into the jar, relieve the vacuum and by thereby neutralizing the external atmospheric pressure facilitate the lifting and removal of the cap or closure. Ordinarily, however, a raised rim exists at the mouth of a jar, such rim being located interiorly with respect to the seat. It keeps the packing ring and cap or closure from displacement transversely of the jar-mouth. This raised rim constitutes an obstacle which prevents a knife-blade or other implement from being more than slightly entered between the rim of the cap or closure and the seat, and thereby renders it difficult to open a jar. The operation of prying often results in more or less breaking and splintering of the glass of which the cap or closure and the jar are formed.

A special aim of the invention is, by a simple modification of the raised rim aforesaid, or of the equivalent thereof provided in the case of modified forms of jars and closures, to provide for the application of a knife-blade or the like in such manner as to facilitate the admission of air and the freeing of the cap or closure, and in such manner, also, as to eliminate all tendency to breaking or splintering of the cap or closure and jar-mouth.

Embodiments of the invention are shown in the drawings, in which latter,—

Figure 1:
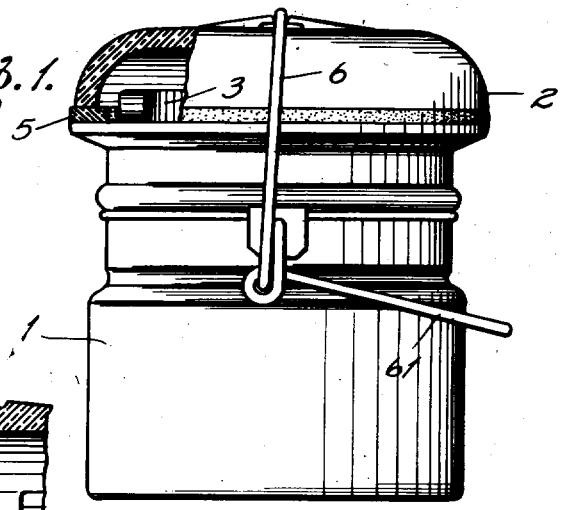
Fig. 1 shows a jar and its cover with the invention applied in connection therewith, the cover being represented as partly broken away.
Figure 3:
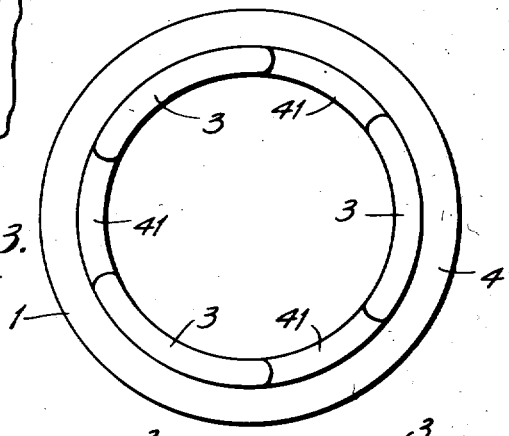
Fig. 3 is a plan view of the jar.
Figure 2:
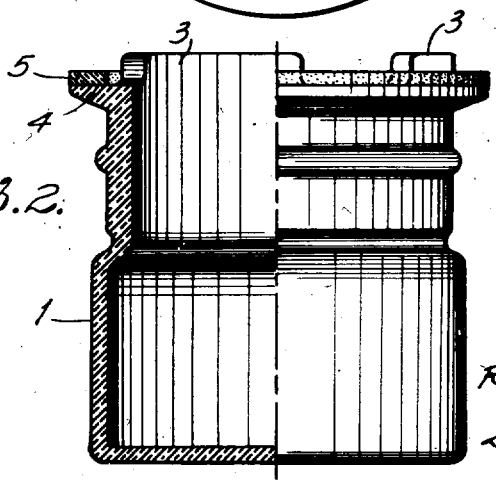
Fig. 2 shows the jar of Fig. 1, without the cover, the jar being partly in side elevation and partly in vertical section, with a packing ring in place on the seat at the mouth-end of the jar.

As represented in Figs. 1, 2 and 3 of the drawings, the jar 1 and cover 2 shown in such views are as heretofore in the art, save in the respect in which the raised or upstanding rim 3 of the jar, at the mouth of the latter, is modified in carrying the invention into effect. As thus represented, the jar 1 is formed with a seat 4, Fig. 2, at the mouth-end thereof, around the raised rim 3 and exteriorly of the latter, to which seat the packing ring 5 is applied, as well as the downturned rim or cap or closure 2. Said downturned rim is shown in Fig. 1 resting in customary manner upon the packing ring and encircling the raised rim 3 of the jar-mouth.

At 6, Fig. 1, is shown the usual locking bail by means of which the cap or closure is held under pressure to its seat. The operating handle of such bail is indicated at 61.

In accordance with the invention I form the raised upstanding rim 3 with one or more gaps or notches 41, 41, therein, as shown in Fig. 3. When more than one gap or notch is formed in the said rim, the latter thereby is given a crenelated character. The notched or crenelated raised or upstanding rim subserves as efficiently as the former continuous raised rim the function of positioning the packing ring and the cap or cover with relation to the mouth of the jar and to the seat around such mouth. The gaps or notches are substantially in the plane of the seat.

When it is desired to effect unsealing of the cap or closure, and removal thereof, the end of a knife-blade or other convenient implement is pushed inward beneath the rim of the cap or closure, either above or below the packing ring, and also into or through one of the gaps or notches 41, 41. By reason of the gap or notch into which the blade or implement is directed being substantially in the plane of the seat, it allows the blade or other implement to enter unobstructedly radially in a horizontal direction as far as may be required for admission of air into the jar to equalize the atmospheric pressure inside and outside, or for enabling the knife-blade or other implement to be utilized effectively in lifting the cap or closure in overcoming adhesion to the seat.

The invention is capable of being applied in the case of jars and caps or closures of various shapes and sizes.

Figure 4:
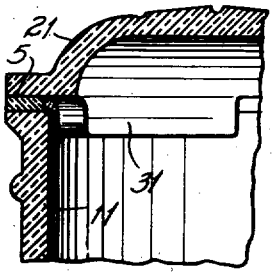
Fig. 4 is a sectional view showing another form of embodiment of the principle of the invention.

In Fig. 4 the crenelated rim or flange, 31, is formed on the underside of the cap or closure, 21, and extends down within the annular mouth of the jar, 11, such mouth being plain and without a raised rim in this instance, and its end-surface constituting the seat for the packing ring 5.

Each of the foregoing illustrative embodiments of the principle of the invention comprises a jar having a seat around its open mouth, and a cap or closure which is applied to said seat, one of said parts having a projecting rim or flange interlapping with an annular portion of the other of such parts, said flange formed with a gap or notch which is intersected by the plane of the seat.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

What is claimed as the invention is:—

1. A jar having a packing-ring seat around its open mouth, and a cap or closure which is applied to said seat, one of said parts having a rim or flange projecting across the plane of the said seat, and such rim or flange being formed with a gap or notch so located with respect to the packing-ring seat as to permit a knife-blade or the like, inserted beneath the edge of the cap or closure at the packing-ring seat to be thrust past such seat, through the gap or notch, and moved beyond said rim or flange, into the interior of the jar to facilitate dislodgment of the cap or closure.

2. A jar having a seat around its open mouth, and a cap or closure which is applied to said seat, one of said parts having a projecting crenelated rim or flange projecting across the plane of the said seat, with the gaps or notches of the said rim or flange so located with respect to such seat as to permit a knife-blade, or the like, inserted beneath the edge of the cap or closure at such seat to be thrust past the seat, through a gap or notch, and inward beyond said rim or flange, into the interior of the jar to facilitate dislodgment of the cap or closure.

3. A jar of the type having at the mouth-end thereof an exteriorly accessible seat and applied packing-ring, and a cap or closure which contacts by a rim thereof with said packing-ring, one of the said parts provided with a supplemental rim or flange projecting across the plane of said seat, said jar characterized by having the said supplemental rim or flange formed with a gap or notch so located with respect to the seat as to permit a knife-blade, or the like, to be applied at the packing-ring and pushed inward past such ring through the gap or notch in said projecting rim or flange and into the jar to facilitate dislodgment of the cap or closure.

4. A jar having a packing-ring seat around its open mouth, and a closure which is applied to said seat, one of said parts having a flange of less external diameter than the internal periphery of said seat, said flange projecting across the plane of the said seat, said flange being formed with a notch, the base of which is substantially flush with a packing ring engaging surface of the part in which the notch is formed, said notch being so located with respect to the packing-ring seat as to permit a knife-blade, or the like, to be inserted beneath the edge of the cap or closure at the packing-ring seat and thrust radially inward past such seat and into the notch, to facilitate the breaking of any vacuum which may exist within the sealed jar and thereby to assist the dislodgment of the closure.

5. The combination of a jar of the type having at the mouth-end thereof an exteriorly accessible annular seat forming the upper surface of the jar, a packing ring seated on said annular surface, and a cap or closure having a downwardly facing annular surface to seat on the packing-ring, said surface of the cap being formed on the rim thereof, said cap being formed with a supplemental rim or flange of less diameter than said annular surfaces and projecting downward interiorly of the jar and across the plane of said seat, said supplemental rim or flange being formed with a gap or notch so located with respect to the seat as to permit a knife-blade, or the like, to be applied at the packing-ring and pushed radially inward past such ring and into the gap or notch in said projecting rim or flange to facilitate the breaking of any vacuum which may exist within the sealed jar and the dislodgment of the cap or closure.

6. A jar having a packing-ring seat around its open mouth, and a cap or closure which is applied to said seat, one of said parts having a rim or flange projecting across the plane of the said seat, and such rim or flange being formed with a gap or notch so located with respect to the packing-ring seat as to permit a knife-blade, or the like, inserted beneath the edge of the cap or closure at the packing-ring seat to be thrust past such seat and into the gap or notch, to facilitate dislodgment of the cap or closure.

7. A jar of the type having at the mouth-end thereof an exteriorly accessible seat and applied packing-ring, and a cap or closure which contacts by a rim thereof with said packing-ring, one of the said parts provided with a supplemental rim or flange projecting across the plane of said seat, said jar being characterized by having the said supplemental rim or flange formed with a gap or notch so located with respect to the seat as to permit a knife-blade, or the like to be applied at the packing-ring and pushed inward past such ring and into the gap or notch in said projecting rim or flange to facilitate dislodgment of the cap or closure.

In testimony whereof, I have signed my name to this specification this fourteenth day of September, 1929.

RAYMOND H. PARKER.